United States Patent
Schepis et al.

(10) Patent No.: US 9,268,964 B1
(45) Date of Patent: Feb. 23, 2016

(54) TECHNIQUES FOR MULTIMEDIA METADATA SECURITY

(75) Inventors: Adam Paul Schepis, Milford, MA (US); Andrew Caola, Shrewsbury, MA (US)

(73) Assignee: Symantec Corporation, Mountain View, CA (US)

( * ) Notice: Subject to any disclaimer, the term of this patent is extended or adjusted under 35 U.S.C. 154(b) by 290 days.

(21) Appl. No.: 13/079,223

(22) Filed: Apr. 4, 2011

(51) Int. Cl.
*G06F 21/62* (2013.01)

(52) U.S. Cl.
CPC ............ *G06F 21/6227* (2013.01); *G06F 21/62* (2013.01)

(58) Field of Classification Search
CPC .............. H04N 2201/3226; H04N 2201/3281; G06F 17/30265; G06F 2221/2107; G06F 17/30244; G06F 17/30268; G06F 21/10; G06F 21/6209; G06F 21/6218; G06F 2221/2213; G06F 21/6227; G06F 21/62; G06F 21/6245; G06Q 50/01
USPC .................. 713/168, 181, 189, 193; 726/2–8, 726/26–30
See application file for complete search history.

(56) References Cited

U.S. PATENT DOCUMENTS

| | | | | |
|---|---|---|---|---|
| 7,792,787 | B2 * | 9/2010 | Sincaglia ........... | H04N 7/17318 707/607 |
| 8,479,299 | B1 * | 7/2013 | Cooley ............................. | 726/26 |
| 8,560,785 | B1 * | 10/2013 | Malhotra et al. .............. | 711/162 |
| 2002/0077988 | A1 * | 6/2002 | Sasaki et al. ..................... | 705/59 |
| 2003/0120940 | A1 * | 6/2003 | Vataja ............................ | 713/193 |
| 2004/0123131 | A1 * | 6/2004 | Zacks et al. .................... | 713/200 |
| 2004/0201751 | A1 * | 10/2004 | Bell et al. .................. | 348/231.99 |
| 2005/0137983 | A1 * | 6/2005 | Bells .................................. | 705/51 |
| 2006/0004699 | A1 * | 1/2006 | Lehikoinen et al. .............. | 707/2 |
| 2007/0022306 | A1 * | 1/2007 | Lindsley ................. | G06F 21/10 713/193 |
| 2007/0083467 | A1 * | 4/2007 | Lindahl et al. ................... | 705/50 |
| 2008/0162931 | A1 * | 7/2008 | Lord et al. ...................... | 713/165 |
| 2009/0077129 | A1 * | 3/2009 | Blose .......................... | 707/104.1 |
| 2010/0088522 | A1 * | 4/2010 | Barrus et al. ................... | 713/181 |
| 2011/0066844 | A1 * | 3/2011 | O'Toole, Jr. ............ | G06F 21/10 713/153 |
| 2011/0129120 | A1 * | 6/2011 | Chan ............................. | 382/103 |
| 2011/0154033 | A1 * | 6/2011 | Nakagoe et al. .............. | 713/168 |
| 2011/0238725 | A1 * | 9/2011 | Imai et al. ...................... | 709/201 |
| 2011/0238737 | A1 * | 9/2011 | Agrawal et al. ............... | 709/203 |

OTHER PUBLICATIONS http://openid.net/connect/faq.*
Facebook Web Page: Help Center—Photos: How do I add or change a profile picture? Retrieved from the Internet on Jun. 2, 2011 at: http://www.facebook.com/help/new/?faq=13568&tq.
Google Webmaster Central Web Page : Images—Webmaster Tools Help, Retrieved from the Internet on Jun. 2, 2011 at: http://www.google.com/support/webmasters/bin/answer.py?answer=114016.

* cited by examiner

*Primary Examiner* — Tae Kim
(74) *Attorney, Agent, or Firm* — Wilmer Cutler Pickering Hale and Dorr LLP

(57) ABSTRACT

Techniques for multimedia metadata security are disclosed. In one particular embodiment, the techniques may be realized as a method for multimedia metadata security comprising receiving an indication that multimedia metadata has been created for a multimedia file, and encrypting, using at least one computer processor, the multimedia metadata stored in a body of the multimedia file.

19 Claims, 5 Drawing Sheets

TECHNIQUES FOR MULTIMEDIA METADATA SECURITY

FIELD OF THE DISCLOSURE

The present disclosure relates generally to multimedia metadata and, more particularly, to techniques for multimedia metadata security.

BACKGROUND OF THE DISCLOSURE

Digital images and video may contain embedded metadata including, for example, an owner's name, location, time of day, camera settings, and other image associated attributes. For example, some digital cameras and other devices may use the Exchangeable Image File format (EXIF) to store metadata in an image, video, or audio file. The use of such metadata is increasing with an increase in the use of digital cameras, cell phones, PDAs, and other devices. Such metadata may be useful to search for and/or organize images or video by location, time, name, etc. However, digital images and/or video are frequently not secured and may be shared (e.g., posted to the Internet on a social networking site or a photo sharing site.) Users may not be aware of the metadata associated with their images and/or video and may not understand implications and potential vulnerabilities of making metadata and images or video publicly available. A malicious user could use this information to stalk someone. A criminal could search for public social networking profiles (e.g., Facebook profiles) in an area, download the images and try to figure out the times of day that a person is out of their house, etc. In addition to criminal threats, a user loses further privacy by publicly exposing not only the image but also the date, time, and name associated with the image or other media file.

Deleting such metadata may lose all of the benefits of the metadata. Making all of the metadata publicly available may create all of the vulnerabilities described above.

In view of the foregoing, it may be understood that there may be significant problems and shortcomings associated with current multimedia metadata security technologies.

SUMMARY OF THE DISCLOSURE

Techniques for multimedia metadata security are disclosed. In one particular embodiment, the techniques may be realized as a method for multimedia metadata security comprising receiving an indication that multimedia metadata has been created for a multimedia file, and encrypting, using at least one computer processor, the multimedia metadata stored in a body of the multimedia file.

In accordance with other aspects of this particular embodiment, the multimedia metadata may comprise metadata structured according to the Exchangeable image file format (Exit).

In accordance with further aspects of this particular embodiment, the indication that digital multimedia metadata has been created may be received when an image is created by a digital camera.

In accordance with additional aspects of this particular embodiment, the indication that digital multimedia metadata has been created may be received when an image is received by a website.

In accordance with additional aspects of this particular embodiment, the website may comprise a social networking site.

In accordance with additional aspects of this particular embodiment, the indication that digital multimedia metadata has been created may be received when an image is created by a computer.

In accordance with additional aspects of this particular embodiment, an indication of digital image metadata creation may be received when an image is received by a network device.

In accordance with additional aspects of this particular embodiment, the network device may comprise at least one of: a gateway, a firewall, a router, network based storage, and a server.

In accordance with additional aspects of this particular embodiment, the techniques may further include receiving a request from a requestor to access one or more portions of encrypted multimedia metadata, receiving authentication of the requestor, and providing access to the one or more portions of encrypted multimedia metadata.

In accordance with additional aspects of this particular embodiment, providing access to the one or more portions of encrypted multimedia metadata comprises providing access to an encrypted key stored in the multimedia file, wherein the encrypted key decrypts the one or more portions of encrypted multimedia metadata.

In accordance with additional aspects of this particular embodiment, providing access to the one or more portions of encrypted multimedia metadata may comprise providing a key for decrypting the one or more portions of encrypted multimedia metadata.

In accordance with additional aspects of this particular embodiment, the techniques may further include applying a rule controlling access to one or more portions of encrypted multimedia metadata.

In accordance with additional aspects of this particular embodiment, the techniques may further include receiving a request from a requestor to access one or more portions of encrypted multimedia metadata, receiving authentication of the requestor, determining a level of access encrypted multimedia metadata based on the rule, and providing the determined level of access to the one or more portions of encrypted multimedia metadata.

In accordance with additional aspects of this particular embodiment, the determined level of access may further comprise at least one of: no access, access to a name associated with a multimedia file, access to a time associated with a multimedia file, access to a location associated with a multimedia file, and access to multimedia file attributes.

In accordance with additional aspects of this particular embodiment, the techniques may further include removing the metadata stored in the body of the multimedia file, and providing one or more portions of the metadata to a requestor after authentication of the requestor.

In accordance with additional aspects of this particular embodiment, authentication may comprise at one of: Open Authorization (OAuth), OpenID, a digital certificate, and email verification.

In accordance with additional aspects of this particular embodiment, a service provider may perform at least one of: providing access to the one or more portions of encrypted multimedia metadata and encrypting multimedia metadata stored in the body of a multimedia file.

In accordance with additional aspects of this particular embodiment, the techniques may be realized as at least one processor readable non-transitory storage medium for storing a computer program of instructions configured to be readable by at least one processor for instructing the at least one processor to execute a computer process for performing the method of an embodiment.

In another particular embodiment, the techniques may be realized as an article of manufacture for multimedia metadata security. The article of manufacture may comprise at least one non-transitory processor readable medium and instructions stored on the at least one medium. The instructions may be configured to be readable from the at least one medium by at least one processor and thereby cause the at least one processor to operate so as to receive an indication that multimedia metadata has been created for a multimedia file, and encrypt multimedia metadata stored in a body of the multimedia file.

In yet another particular embodiment, the techniques may be realized as a system for multimedia metadata security comprising one or more processors communicatively coupled to a network, wherein the one or more processors are configured to receive an indication that multimedia metadata has been created for a multimedia file, and encrypt multimedia metadata stored in a body of the multimedia file.

The present disclosure will now be described in more detail with reference to embodiments thereof as shown in the accompanying drawings. While the present disclosure is described below with reference to embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
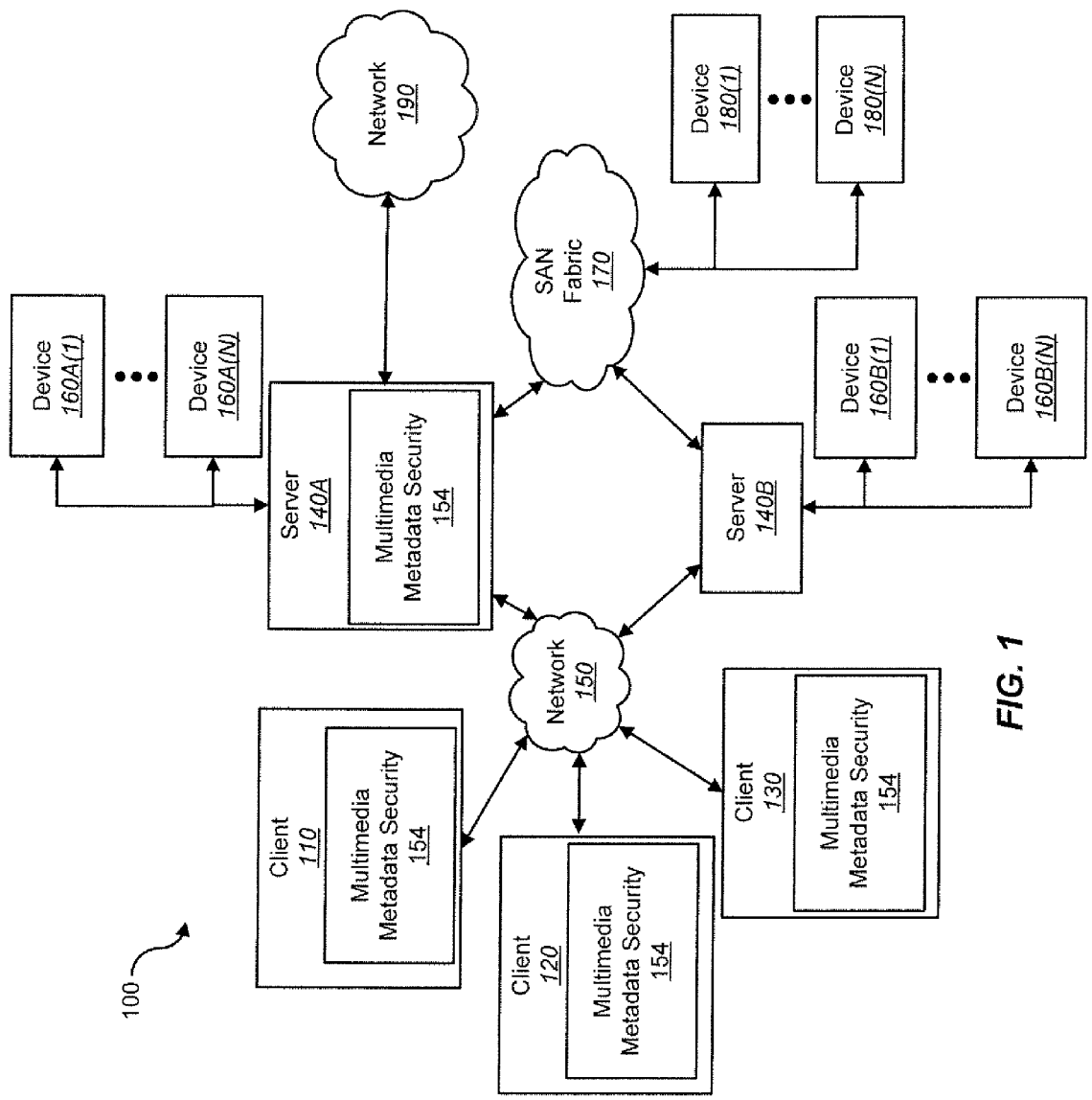
FIG. 1 shows a block diagram depicting a network architecture for multimedia metadata security in accordance with an embodiment of the present disclosure.

FIG. 1 shows a block diagram depicting a network architecture 100 for multimedia metadata security in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., multimedia metadata security module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150. Server 140A may be communicatively coupled to network 190.

The description below describes network elements, computers, and/or components of a system and method for multimedia metadata security that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are illustrative. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
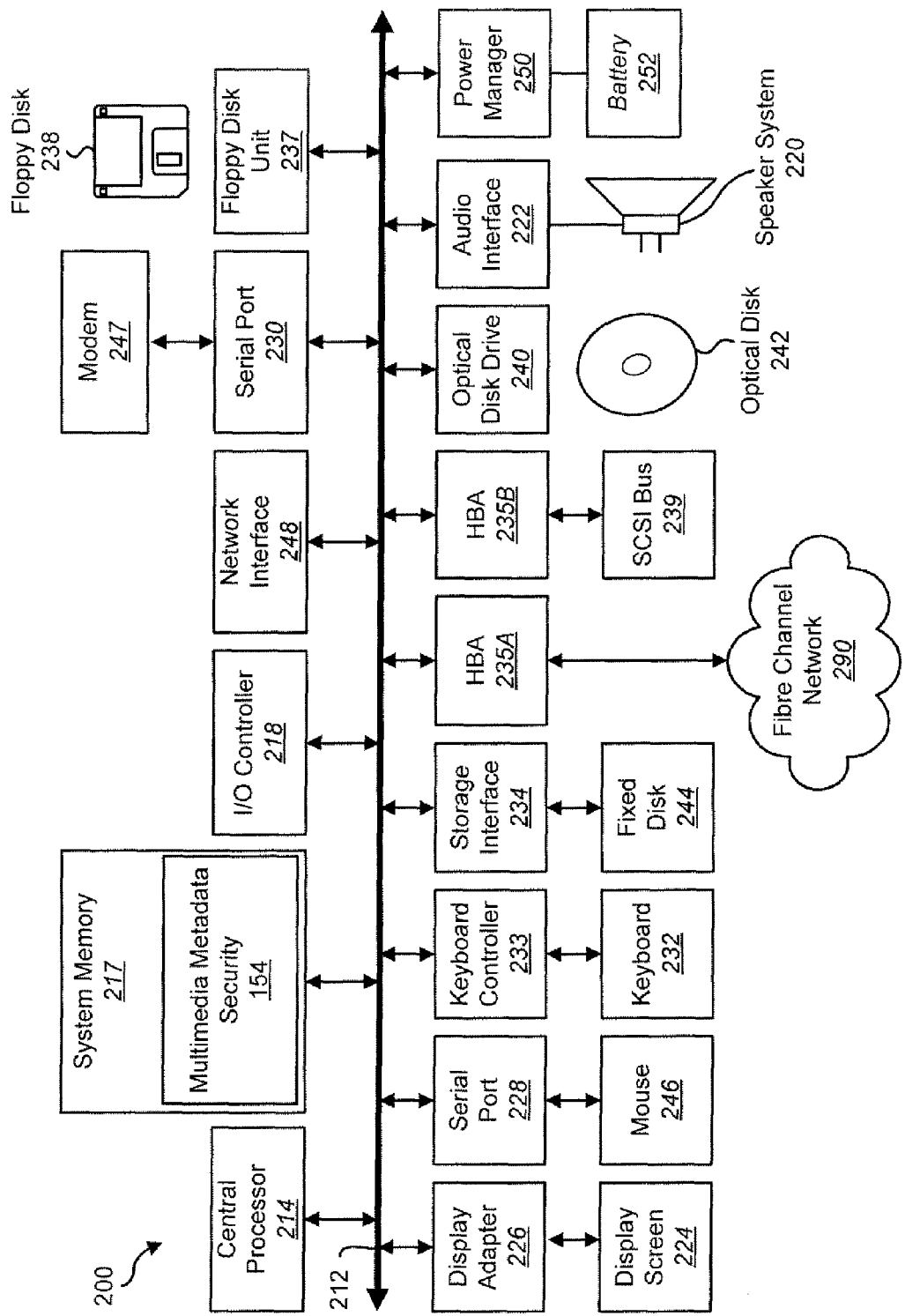
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software. Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the illustrative types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors. According to some embodiments, servers 140A and 140E may be websites such as, for example, social network sites.

According to some embodiments, clients 110, 120, and/or 130 may contain one or more portions of software for multimedia metadata security such as, for example, multimedia metadata security module 154. As illustrated, one or more portions of multimedia metadata security module 154 may reside at a client. One or more portions of multimedia metadata security module 154 may reside at a network centric location. For example, server 140A may be a server, a firewall, a proxy server, a gateway, a search engine, or other network element that may perform one or more actions to provide multimedia metadata security. According to some embodiments, network 190 may be an external network (e.g., the Internet) and server 140A may be a gateway, a proxy server, a search engine, and/or a firewall between one or more internal components and clients and the external network.

According to some embodiments, multimedia metadata security module 154 may be implemented in several portions which may be co-located or located remote from one another. According to one or more embodiments, multimedia metadata security may be performed by a third party (e.g., a service provider and/or a security software vendor). Results of multimedia metadata security may be provided to one or more clients.

According to some embodiments, clients 110, 120, and 130 may be digital cameras, smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. Clients 110, 120, and 130 may be capable of creating digital media such as images, video, and/or audio which may contain embedded metadata. Metadata may be embedded in one or more formats such as, for example, the Exchangeable Image File format (EXIF), IPTC Information Interchange Model, and Extensible Metadata Platform (XMP). Clients 110, 120, and 130 may also be platforms which may edit, manage, and/or view digital media created on one or more platforms.

As discussed above, multimedia metadata security may be implemented at one or more levels including a client level (e.g., a smartphone, digital camera, desktop, etc.), a network level (e.g., a gateway, a firewall, etc.), a server level (e.g., a social media site, a photo sharing site, a company server, etc.), a third party service provider, or a combination of levels. Multimedia metadata security may include encryption, decryption, and data rights management. For example, a digital camera or a device containing a digital camera may contain a module that may encrypt metadata embedded in an image (e.g., EXIF data) when an image is created and/or modified. According to some embodiments, metadata may be embedded in an image or other media file in an unencrypted format and may be encrypted prior to distribution or transfer from a device (e.g., uploading of an image to a website). Digital image metadata may be encrypted with a unique key for each file. According to some embodiments, different portions of metadata may be encrypted differently. For example, a name may encrypted differently from a location or date information (e.g., different keys may be used). Some portions of metadata may not be encrypted (i.e., they may not be considered sensitive). According to some embodiments, a key, which may be used to access the digital data, may be encrypted and associated with the metadata (e.g., stored in an EXIF tag encrypted with the user's primary key).

A component providing encryption may also embed in or associate with the digital file information used to access decryption resources. For example, a URL, a network address, or other information may be provided to which a decryption request may be made. According to some embodiments, decryption requests may be made to a local resource or a resource associated with a file type (e.g., a local decryption tool or a decryption service associated with a file type).

Encryption of digital media file metadata may occur not only when an image is created but also or instead during other events. For example, network storage may encrypt metadata of a digital image upon receipt. A social networking site may encrypt metadata associated with digital media upon upload. A video or photo editing, organizing, sharing and/or distribution tool may encrypt metadata upon saving, receipt, or transfer of an image or video (e.g., iPhoto, Photoshop, etc.). Digital media metadata security may be provided as part of a component used to import or manipulate digital media on a device or storage. According to some embodiments, digital media metadata security may be provided as a service (e.g., by a third party solution provider) and may be implemented as a security package monitoring file types at a client, a server, storage, and/or network level. Digital media metadata security may be performed continuously (e.g., encryption at creation of a digital media file), periodically, on demand, or during other increments or events. According to some embodiments, one or more portions of metadata may be removed from a file and may be provided to a requestor based upon authentication and/or application of one or more rules.

In addition to encryption clients 110, 120, and 130, servers 140A and 140B, or another platform or service may allow the creation of one or more rules, policies, access lists, groups, or other data structures governing access to digital media metadata. For example, a data rights management service may provide access to EXIF data. A data rights management service may be provided by a local component or module. According to at least one embodiment, a data rights management service may be provided as a web service. Users may sign up for the service and integrate it with their photo software, smartphone, digital camera, or other client device or application. According to some embodiments, the service may be integrated with a website such as, for example, a social media site or a photo sharing site. This component may provide different areas of functionality. It may allow a user to create access control rules for their digital media (e.g., photos) metadata. Exemplary rules and access control may include permission and/or denial based upon an access requestor's email address. For example, a digital image owner may create a rule specifying a list of email addresses permitted to access one or more portions of digital image metadata. A data rights management service may be integrated with one or more social networks to create more complex rules. For example, integration with a social network may allow creation of or association with access lists of a social network (e.g., provide access to image metadata for people on my friends list but not to people on my co-workers list). A data rights management service may provide different levels of granularity to allow access controls to specific types of information (e.g., allow access metadata associated with time and name information, but not location information). As another example, a user may limit access to images and/or image metadata based on content of the metadata as it is related to a requestor by one or more rules. For example, a user may associate a requestor with a work location, a home location, or a school location. A requestor associated with a location may view metadata and/or images associated with the location. A user may also specify a time range for an event (e.g., a concert, a sporting event, or a vacation). One or more contacts of a user may be associated with those timeframes and may be able to view the corresponding metadata of images and/or the images themselves. Another exemplary rule may create a general schedule and may permit certain requestors to view metadata of images and/or the images themselves if the image metadata has dates and/or locations that correspond to the permitted access. For example, a work schedule and/or location may be specified and contacts identified as co-workers may be permitted to access metadata and/or images that correspond to the work schedule and/or location. Image metadata corresponding to non-work schedules and/or locations may be visible only to another group of contacts (e.g., friends and/or relatives).

A data rights management service may provide functionality to an encryption or securing component. For example, a data rights management service may improve the security of the sensitive data by being the sole owner of a user's primary encryption key. A data rights management service may expose a service that an encryption component may use to generate a new key for each image. As discussed above, an encryption component may use such a key to encrypt the sensitive data and the key may be encrypted with a user's primary key and stored associated with the metadata of an image file (e.g., in an EXIF tag). A data rights management service may also provide a URL, network address, or other access information for an encryption component to embed in the metadata data so that viewers of the file can initiate a decryption request.

Clients 110, 120, and 130, servers 140A and 140B, or another platform or service may also provide decryption functionality. Decryption functionality may include or access one or more authentication or verification services such as, for example, Open Authorization (OAuth), OpenID, a digital certificate, and email verification. According to at least one embodiment, when a decryption request is made a requestor may send an encrypted version of the key for an image (e.g., from an EXIF tag in the image). The identity of the requestor may be established (e.g., via email verification, or OAuth/OpenID integration with a social network or internet service.) Once the identity of the requestor is established, access rules may be applied to the request. For example, an id, email address, name, of other indicia of the requestor may be cross referenced with the access control rules created by the creator of the media. If a requestor is unknown or not allowed to decrypt the data, then the call fails. If a requestor is allowed to decrypt the data, the requestor may be provided with the unencrypted form of the key to be used in decryption.

According to some embodiments, a unique name or id may be associated with each image. In these embodiments, an encrypted key may not be stored associated with the image. In these embodiments, a requestor may send the unique name or id associated with the image and, upon authentication and/or application of one or more rules, the requestor may receive the key to decrypt the image. According to some embodiments, an requestor may send the entire image containing the encrypted metadata and upon authentication and/or application of one or more rules, the requestor may receive the image containing the unencrypted metadata.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, multimedia metadata security module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

According to some embodiments, multimedia metadata security module 154 may be provided as part of a component used to import or manipulate digital media on a device or storage. According to some embodiments, digital media metadata security may be provided as a service (e.g., by a third party solution provider) and may be implemented as a security package monitoring file types at a client, a server, storage, and/or network level. For example, multimedia metadata security module 154 may be invoked as an operating system driver during network transactions and may encrypt metadata, decrypt metadata, and/or provide other metadata security functionality.

Figure 3:
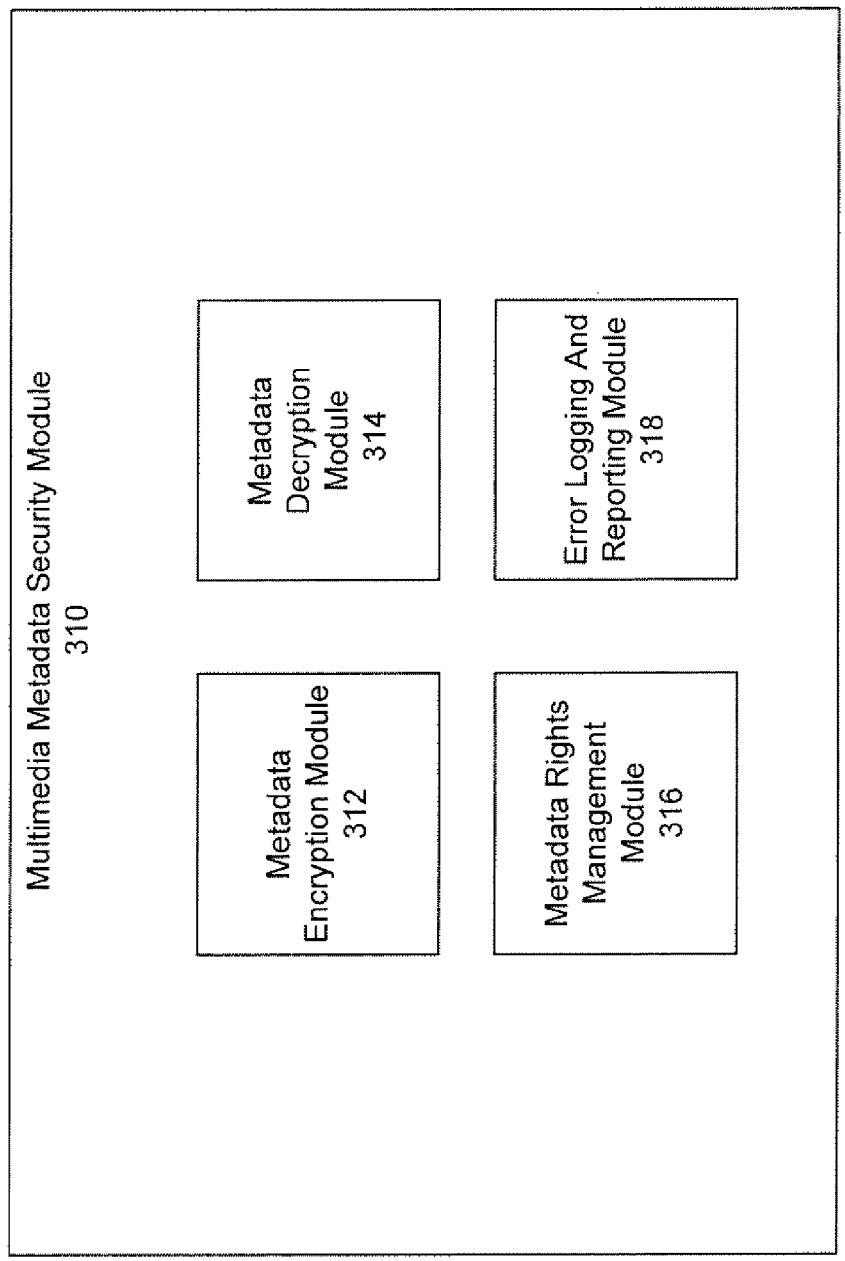
FIG. 3 shows a module for multimedia metadata security in accordance with an embodiment of the present disclosure.

Referring to FIG. 3, there is shown a multimedia metadata security module 310 in accordance with an embodiment of the present disclosure. As illustrated, the multimedia metadata security module 310 may contain one or more components including metadata encryption module 312, metadata decryption module 314, metadata rights management module 316, and error logging and reporting module 316.

Metadata encryption module 312 may be implemented at one or more levels including a client level (e.g., a smartphone, digital camera, desktop, etc.), a network level (e.g., a gateway, a firewall, etc.), a server level (e.g., a social media site, a photo sharing site, a company server, etc.), a third party service provider, or a combination of levels. Metadata encryption module 312 may encrypt metadata embedded in an multimedia file (e.g., EXIF data) when the multimedia is created and/or modified. According to some embodiments, metadata may be embedded in an image or other media file in an unencrypted format and may be encrypted prior to distribution or transfer from a device (e.g., uploading of an image to a website). Digital image metadata may be encrypted with a unique key for each file. According to some embodiments, different portions of metadata may be encrypted differently. For example, a name may encrypted differently from a location or date information (e.g., different keys may be used). Some portions of metadata may not be encrypted (i.e., they may not be considered sensitive). According to some embodiments, a key, which may be used to access the digital data, may be encrypted and associated with the metadata (e.g., stored in an EXIF tag encrypted with the user's primary key).

Metadata encryption module 312 may also embed in or associate with the digital file information used to access decryption resources. For example, a URL, a network address, or other information may be provided to which a decryption request may be made.

Encryption of digital media file metadata may occur not only when an image is created but also or instead during other events. For example, metadata encryption module 312 may be implemented on a network storage platform which may encrypt metadata of a digital image upon receipt. A social networking site may implement metadata encryption module 312 to encrypt metadata associated with digital media upon upload. A video or photo editing, organizing, sharing and/or distribution tool may implement metadata encryption module 312 to encrypt metadata upon saving, receipt, or transfer of an image or video (e.g., iPhoto, Photoshop, etc.). Metadata encryption module 312 may be provided as part of a component used to import or manipulate digital media on a device or storage. According to some embodiments, metadata encryption module 312 may provide digital media metadata security as a service (e.g., by a third party solution provider). Metadata encryption module 312 may be implemented as a security package monitoring file types at a client, a server, storage, and/or network level. Digital media metadata security may be performed continuously (e.g., encryption at creation of a digital media file), periodically, on demand, or during other increments or events.

Metadata decryption module 314 may be implemented at one or more levels including, for example, clients 110, 120, and 130, servers 140A and 140B of FIG. 1, or another platform or service which may also provide decryption functionality. Metadata decryption module 314 may include or access one or more authentication or verification services such as, for example, Open Authorization (OAuth), OpenID, a digital certificate, and email verification. According to at least one embodiment, when metadata decryption module 314 may receive decryption request from a requestor which may include an encrypted version of a key for an image (e.g., from an EXIF tag in the image). The identity of the requestor may be established (e.g., via email verification, or OAuth/OpenID integration with a social network or internet service.) Once the identity of the requestor is established, access rules may be applied to the request. Metadata decryption module 314 may invoke metadata rights management module 316 or request a service from metadata rights management module 316 to determine access to an image file based on access rules. According to some embodiments, metadata decryption module 314 may be a part of or may be invoked by metadata rights management module 316. If a requestor is unknown or not allowed to decrypt the data, then the call fails. If a requestor is allowed to decrypt the data, the requestor may be provided with the unencrypted form of the key to be used in decryption.

According to some embodiments, a unique name or id may be associated with each image. In these embodiments, an encrypted key may not be stored associated with the image. In these embodiments, a requestor may send the unique name or id associated with the image and, upon authentication and/or application of one or more rules, the requestor may receive the key to decrypt the image. According to some embodiments, an requestor may send the entire image containing the encrypted metadata and upon authentication and/or application of one or more rules, the requestor may receive the image containing the unencrypted metadata.

Metadata rights management module 316 may be implemented at one or more levels including, for example, on one or more of clients 110, 120, and 130, and servers 140A and 140B of FIG. 1. Metadata rights management module 316 may allow the creation of one or more rules, policies, access lists, groups, or other data structures governing access to digital media metadata. For example, metadata rights management module 316 may provide access to EXIF data. Metadata rights management module 316 may be provided by a local component or module. According to at least one embodiment, metadata rights management module 316 may be provided as a web service. Users may sign up for the service and integrate it with their photo software, smartphone, digital camera, or other client device or application. According to some embodiments, the service may be integrated with a website such as, for example, a social media site or a photo sharing site. Metadata rights management module 316 may provide different areas of functionality. It may allow a user to create access control rules for their digital media (e.g., photos). Exemplary rules and access control may include permission and/or denial based upon an access requestor's email address. For example, a digital image owner may create a rule specifying a list of email addresses permitted to access one or more portions of digital image metadata. Metadata rights management module 316 may be integrated with one or more social networks to create more complex rules. For example, integration with a social network may allow creation of or association with access lists of a social network (e.g., provide access to image metadata for people on my friends list but not to people on my co-workers list). Metadata rights management module 316 may provide different levels of granularity to allow access controls to specific types of information (e.g., allow access metadata associated with time and name information, but not location information).

Metadata rights management module 316 may provide functionality to an encryption or securing component. For example, metadata rights management module 316 may improve the security of the sensitive data by being the sole owner of a user's primary encryption key. Metadata rights management module 316 may expose a service that an encryption component may use to generate a new key for each image. As discussed above, an encryption component may use such a key to encrypt the sensitive data and the key may be encrypted with a user's primary key and stored associated with the metadata of an image file (e.g., in an EXIF tag). Metadata rights management module 316 may also provide a URL, network address, or other access information for an encryption component to embed in the metadata data so that viewers of the file can initiate a decryption request.

Error logging and reporting module 316 may produce logs, reports, or other information associated with multimedia metadata security.

Figure 4:
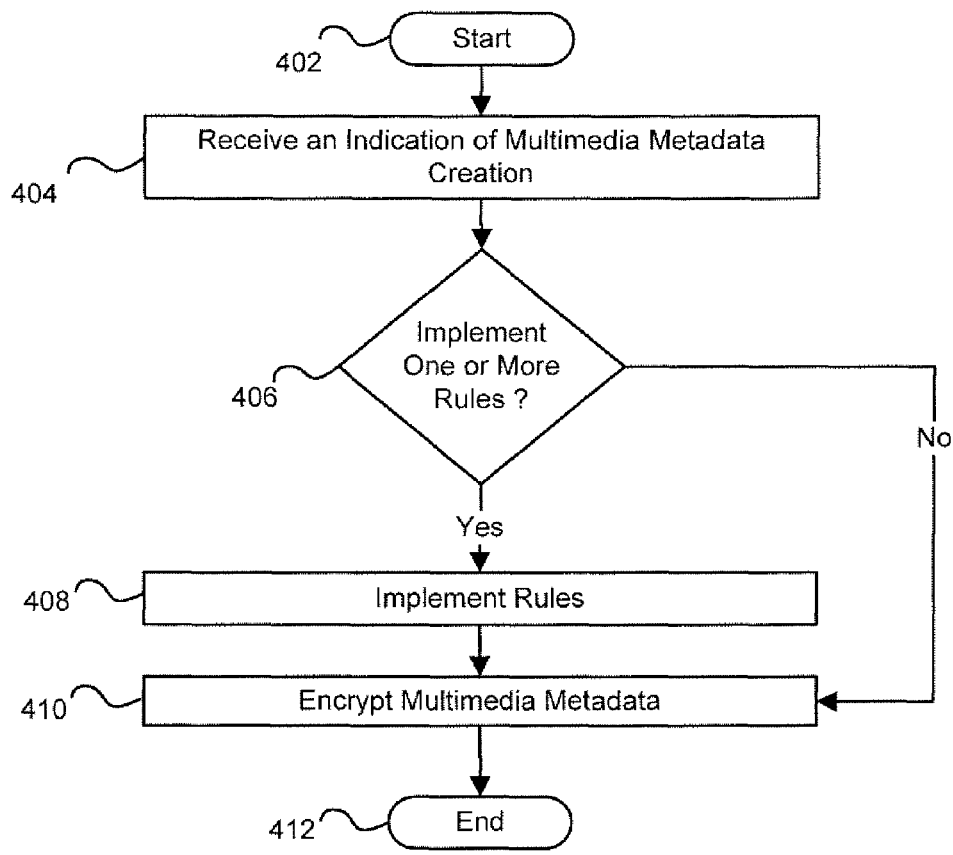
FIG. 4 depicts a method for multimedia metadata security in accordance with an embodiment of the present disclosure.

Referring to FIG. 4, there is depicted a method 400 for multimedia metadata security in accordance with an embodiment of the present disclosure. At block 402, the method 400 may begin.

At block 404, an indication of multimedia metadata creation and/or modification may be received. An indication of multimedia metadata creation and/or modification may be received not only when an image is created but also or instead during other events. For example, an indication of metadata creation and/or modification may be received when an image is transferred, uploaded, and/or manipulated (e.g., edited in a graphics program).

At block 406, it may be determined whether or not to implement one or more rules. One or more rules, policies, access lists, groups, or other data structures governing access to digital media metadata may be created, implemented, and/or applied. For example, access control rules for digital media (e.g., photos) metadata may be implemented. Exemplary rules and access control may include permission and/or denial based upon an access requestor's email address. For example, a digital image owner may create a rule specifying a list of email addresses permitted to access one or more portions of digital image metadata. According to some embodiments, creation of or association with access lists of a social network may be permitted (e.g., provide access to image metadata for people on my friends list but not to people on my co-workers list). Different levels of granularity of access controls to specific types of information may be permitted (e.g., allow access metadata associated with time and name information, but not location information). If no rules are to be implemented, the method may continue at block 410. If rules are to be implemented, the method may continue at block 408.

At block 408, one or more rules may be implemented. According to some embodiments, data rights management may be provided as a service and rules may be implemented at a central location. For example, a service provider may provide a web interface allowing the creation and management of one or more rules. Data rights management may be provided as a web service and may be integrated with other websites (e.g., third party social networking and/or photo sharing sites).

At block 410, image metadata may be encrypted. Digital image metadata may be encrypted with a unique key for each file. According to some embodiments, different portions of metadata may be encrypted differently. For example, a name may encrypted differently from a location or date information (e.g., different keys may be used). Some portions of metadata may not be encrypted (i.e., they may not be considered sensitive). According to some embodiments, a key, which may be used to access the digital data, may be encrypted and associated with the metadata (e.g., stored in an EXIF tag encrypted with the user's primary key).

An encryption process may also embed in or associate with the digital file information used to access decryption resources. For example, a URL, a network address, or other information may be provided to which a decryption request may be made.

At block 412, the method may end.

Figure 5:
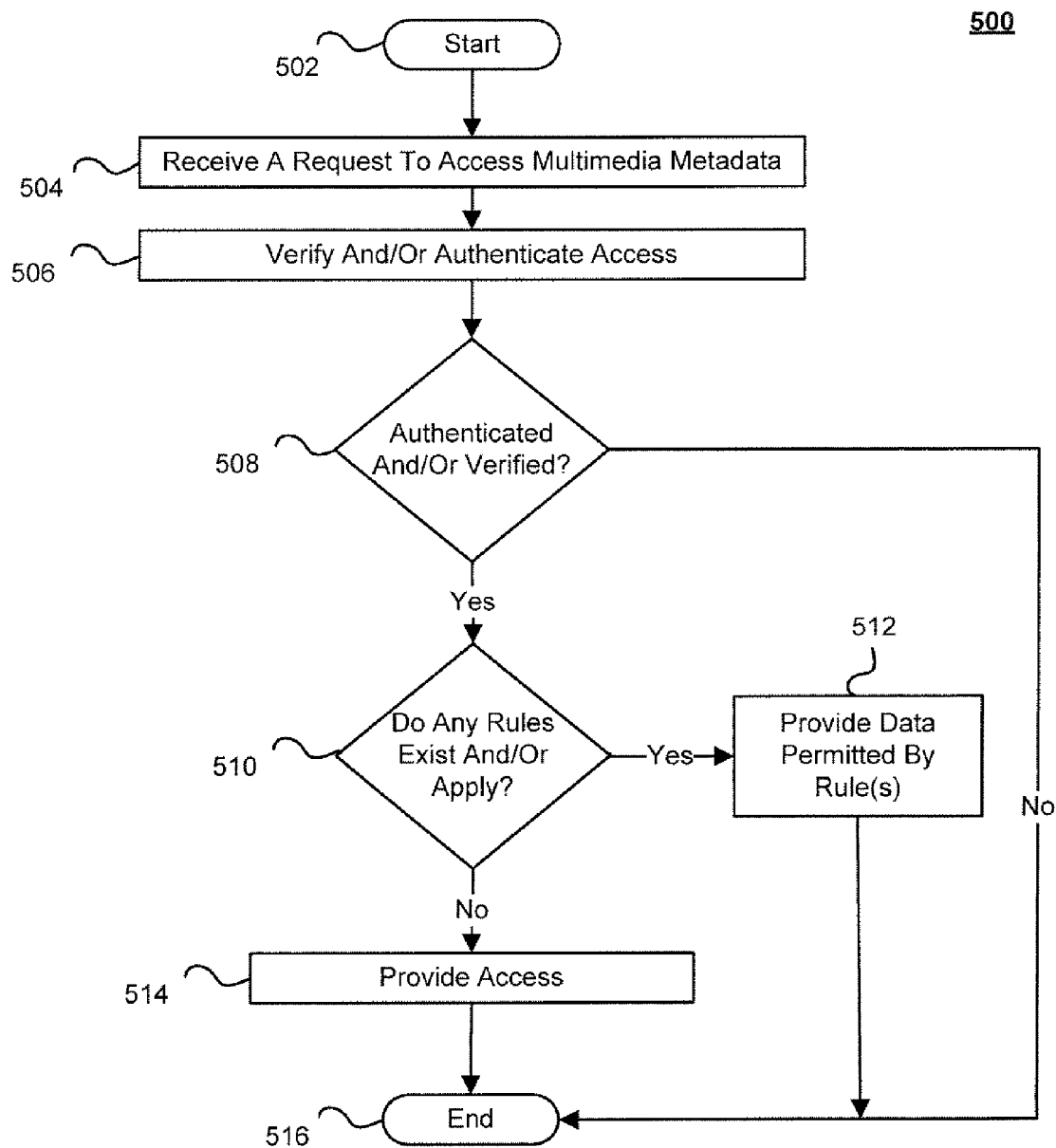
FIG. 5 depicts a method for multimedia metadata security in accordance with an embodiment of the present disclosure.

Referring to FIG. 5, there is depicted a method 500 for multimedia metadata security in accordance with an embodiment of the present disclosure. At block 502, the method 500 may begin.

At block 504, a request may be received to access multimedia metadata. A request may be local (e.g., from a view utility of a digital camera storing an image or from an photo application of a computer storing an image). A request may also be from a remote requestor (e.g., via a web service from a social networking or photo sharing website.)

At block 506, a requestor may be authenticated and/or verified. Authentication and/or verification services may include one or method such as, for example, Open Authorization (OAuth), OpenID, a digital certificate, and email verification.

At block 508, it may be determined whether a requestor has been authenticated and/or verified. If a requestor has been authenticated and/or verified the method may continue at block 510. If a requestor has not been authenticated and/or verified, the method may end at block 516.

At block 510, it may be determined whether any rules exist and/or apply. A requestor may be identified by an email address, an id, and/or other verified attributes and the verified attributes of the requestor may be matched against one or more rules (e.g., an id may be mapped to an access list or an email address may be mapped to a friends list). If any rules exist and/or apply the method may continue at block 512. If rules do not exist and/or apply (e.g., an image owner permits a default level of access for image metadata to all authenticated and/or verified requestors) the method may continue at block 514.

At block 512, the metadata permitted by the rules may be provided to the requestor. If the rules deny access to metadata no metadata will be provided.

At block 514, access to the data may be provided to the requestor.

At block 516, the method may end.

At this point it should be noted that multimedia metadata security in accordance with the present disclosure as described above typically involves the processing of input data and the generation of output data to some extent. This input data processing and output data generation may be implemented in hardware or software. For example, specific electronic components may be employed in a multimedia metadata security module or similar or related circuitry for implementing the functions associated with multimedia metadata security in accordance with the present disclosure as described above. Alternatively, one or more processors operating in accordance with instructions may implement the functions associated with multimedia metadata security in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for multimedia metadata security comprising:
   receiving, at a second device separate from a first device which created a multimedia file, the multimedia file containing unencrypted multimedia metadata;
   encrypting, using the second device, a portion of the unencrypted multimedia metadata stored in a body of the multimedia file, wherein encryption of the portion of unencrypted multimedia metadata is separate from encryption of the multimedia file, and wherein the second device is configured to provide encryption of the portion of the unencrypted multimedia metadata differently from one or more other portions of unencrypted multimedia metadata within the multimedia file based on one or more rules after receipt of the multimedia file from the first device; and
   embedding a network address in the multimedia metadata to facilitate initiation of a decryption request for the portion of the encrypted multimedia metadata, wherein the embedded network address is configured to receive the decryption request.

2. The method of claim 1, wherein the unencrypted multimedia metadata comprises metadata structured according to the Exchangeable image file format (Exif).

3. The method of claim 1, wherein the multimedia file containing unencrypted multimedia metadata is received from a digital camera.

4. The method of claim 1, wherein the multimedia file containing unencrypted multimedia metadata is received by a website.

5. The method of claim 4, wherein the website comprises a social networking site.

6. The method of claim 1, wherein the multimedia file containing unencrypted multimedia metadata is received by a computer.

7. The method of claim 1, wherein the multimedia file containing unencrypted multimedia metadata is received by a network device.

8. The method of claim 7, wherein the network device comprises at least one of: a firewall and a router.

9. The method of claim 1, further comprising:
   receiving a request from a requestor to access the portion of encrypted multimedia metadata;
   receiving authentication of the requestor; and
   providing access to the portion of encrypted multimedia metadata.

10. The method of claim 9, wherein providing access to the portion of encrypted multimedia metadata comprises providing access to an encrypted key stored in the multimedia file, wherein the encrypted key decrypts the portion of encrypted multimedia metadata.

11. The method of claim 9, wherein providing access to the portion of encrypted multimedia metadata comprises providing a key for decrypting the portion of encrypted multimedia metadata.

12. The method of claim 1, further comprising:
   applying a rule controlling access to the portion of encrypted multimedia metadata;
   receiving a request from a requestor to access the portion of encrypted multimedia metadata;
   receiving authentication of the requestor;
   determining a level of access to encrypted multimedia metadata based on the rule; and
   providing the determined level of access to the portion of encrypted multimedia metadata.

13. The method of claim 12, wherein the determined level of access comprises at least one of: no access, access to a name associated with a multimedia file, access to a time associated with a multimedia file, access to a location associated with a multimedia file, and access to multimedia file attributes.

14. The method of claim 1, further comprising:
   removing the unencrypted multimedia metadata stored in the body of the multimedia file; and
   providing one or more portions of the unencrypted multimedia metadata to a requestor after authentication of the requestor.

15. The method of claim 9, wherein authentication comprises at one of: Open Authorization (OAuth), OpenID, a digital certificate, and email verification.

16. The method of claim 1, wherein a service provider performs at least one of: providing access to the portion of encrypted multimedia metadata and encrypting unencrypted multimedia metadata stored in the body of the multimedia file.

17. At least one processor readable non-transitory storage medium for storing a computer program of instructions configured to be readable by at least one processor for instructing the at least one processor to execute a computer process for performing the method as recited in claim 1.

18. An article of manufacture for multimedia metadata security, the article of manufacture comprising:
   at least one non-transitory processor readable medium; and
   instructions stored on the at least one medium;

wherein the instructions are configured to be readable from the at least one medium by at least one processor and thereby cause the at least one processor to operate so as to:

receive, at a second device separate from a first device which created a multimedia file, the multimedia file containing unencrypted multimedia metadata;

encrypt a portion of the unencrypted multimedia metadata stored in a body of the multimedia file, wherein encryption of the portion of the unencrypted multimedia metadata is separate from encryption of the multimedia file, and wherein the second device is configured to provide encryption of the portion of the unencrypted multimedia metadata differently from one or more other portions of unencrypted multimedia metadata within the multimedia file based on one or more rules after receipt of the multimedia file from the first device; and embed a network address in the multimedia metadata to facilitate initiation of a decryption request for the portion of the encrypted multimedia metadata, wherein the embedded network address is configured to receive the decryption request.

19. A system for multimedia metadata security comprising:

one or more processors communicatively coupled to a network; wherein the one or more processors are configured to:

receive, at a second device separate from a first device which created a multimedia file, the multimedia file containing unencrypted multimedia metadata;

encrypt a portion of the unencrypted multimedia metadata stored in a body of the multimedia file, wherein encryption of the portion of unencrypted multimedia metadata is separate from encryption of the multimedia file, and wherein the second device is configured to provide encryption of the portion of the unencrypted multimedia metadata differently from one or more other portions of unencrypted multimedia metadata within the multimedia file based on one or more rules after receipt of the multimedia file from the first device; and embed a network address in the multimedia metadata to facilitate the initiation of a decryption request for the portion of the encrypted multimedia metadata, wherein the embedded network address is configured to receive the decryption request.

\* \* \* \* \*